(12) United States Patent
Pan et al.

(10) Patent No.: US 9,125,205 B2
(45) Date of Patent: Sep. 1, 2015

(54) METHOD, SYSTEM AND DEVICE FOR DETERMINING BANDWIDTH OF UPLINK SOUNDING REFERENCE SIGNAL

(75) Inventors: Xueming Pan, Beijing (CN); Guojun Xiao, Beijing (CN); Shiqiang Suo, Beijing (CN); Yu Ding, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 1084 days.

(21) Appl. No.: 13/056,911

(22) PCT Filed: Jul. 30, 2009

(86) PCT No.: PCT/CN2009/073007
§ 371 (c)(1),
(2), (4) Date: Sep. 30, 2011

(87) PCT Pub. No.: WO2010/012238
PCT Pub. Date: Feb. 4, 2010

(65) Prior Publication Data
US 2012/0014358 A1    Jan. 19, 2012

(30) Foreign Application Priority Data
Jul. 31, 2008    (CN) .......................... 2008 1 0117503

(51) Int. Cl.
*H04W 72/04*    (2009.01)
*H04L 5/00*    (2006.01)
*H04L 5/14*    (2006.01)

(52) U.S. Cl.
CPC ......... *H04W 72/0453* (2013.01); *H04L 5/0051* (2013.01); *H04L 5/0092* (2013.01); *H04L 5/0007* (2013.01); *H04L 5/1469* (2013.01)

(58) Field of Classification Search
CPC .......... H04W 72/0453; H04W 72/044; H04W 72/04; H04L 5/0092; H04L 5/0051; H04L 5/0007; H04L 5/1469
USPC ................... 370/344, 345, 336; 455/519, 552
See application file for complete search history.

(56) References Cited

U.S. PATENT DOCUMENTS

2009/0046800 A1*   2/2009   Xu et al. .................... 375/267
2009/0316676 A1*   12/2009   Kolding et al. ............... 370/345

OTHER PUBLICATIONS

3GPP TS 36.211 v8.3.0 (May 2008), p. 9-30, France, May 2008.*

* cited by examiner

*Primary Examiner* — Pao Sinkantarakorn
*Assistant Examiner* — Richard Chang
(74) *Attorney, Agent, or Firm* — Hoffmann & Baron, LLP (57) ABSTRACT

The present invention discloses a method, system and device for determining a bandwidth of an uplink sounding reference signal SRS. The method for determining the bandwidth of the uplink SRS comprises the following steps: determining whether SRS is transmitted with the uplink pilot time slot if the SRS is transmitted with the largest bandwidth level; transmitting SRS with the non-extensive SRS bandwidth if SRS is determined to be transmitted with the uplink pilot time slot and the UE reaches the power limit. In the present invention, the signal-to-noise ratio detected on the bandwidth with which SRS transmitted can be maintained, and the accurate detection of the channel information is thereby realized.

17 Claims, 4 Drawing Sheets

METHOD, SYSTEM AND DEVICE FOR DETERMINING BANDWIDTH OF UPLINK SOUNDING REFERENCE SIGNAL

TECHNICAL FIELD

The present invention relates to radio communication technology, and in particular, to a method, system and device for determining the bandwidth of an uplink sounding reference signal.

BACKGROUND OF THE INVENTION

In the Long Term Evolution (LTE) project developed from the $3^{rd}$ Generation Partnership Project (3GPP), especially in view of the Time Division Duplex (TDD), the uplink Sounding Reference Signal (SRS) is adapted for obtaining the downlink Channel State Information (CSI) of corresponding frequency bands to perform channel quality sounding and to support operations such as downlink beam forming that is not fed back due to the symmetry of uplink and downlink channels. Moreover, the system can measure the channel information of the downlink channels of the bandwidth with which SRS can be transmitted.

Therefore in the prior art, SRS is transmitted with the bandwidth as wide as possible so as to support measurement of the channel information in the largest bandwidth of the downlink channel.

It is provided in the prior art that SRS generally can be located in the following two positions in LTE TDD:
1. the last symbol of the normal uplink subframe;
2. the Uplink Pilot Time Slot (UpPTS) of the special subframe.

Figure 1:
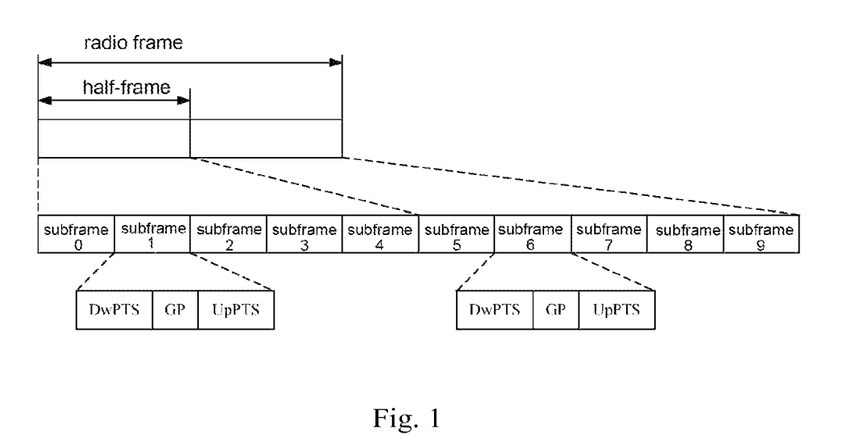
FIG. 1 is a frame structure chart showing LTE TDD in the prior art.

FIG. 1 shows the frame structure of LTE TDD. As shown in FIG. 1, each radio frame consists of two half-frames each of which includes five subframes, i.e. each radio frame consists of ten subframes, e.g. subframe 0 to subframe 9 in the figure, wherein the subframe 1 and subframe 6 are special subframes comprising Downlink Pilot Time Slot (DwPTS), Guard Period (GP) and Uplink Pilot Time Slot (UpPTS), and the other subframes are normal subframes comprising normal uplink subframes.

Figure 2:
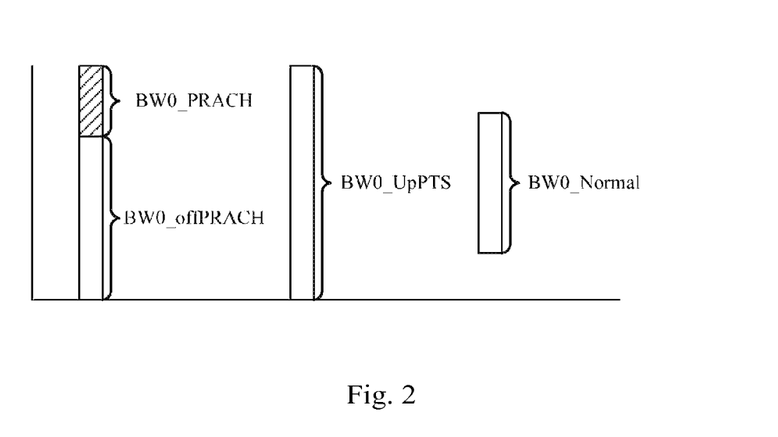
FIG. 2 is a schematic diagram showing bandwidth with which SRS is transmitted in the prior art.

UE transmits SRS with the largest bandwidth level informed by the system if the system informs to transmit SRS with the largest bandwidth level while SRS is located on the normal uplink subframe. As shown in FIG. 2, UE transmits SRS with the largest bandwidth level informed by the system which is, for example BW0_Normal.

The User Equipment (UE) will transmit SRS after extending the bandwidth of the largest level if the system informs to transmit SRS with the largest bandwidth level while SRS is located on UpPTS. Specifically, UpPTS may need to bear Physical Random Access Channel (PRACH). In case UpPTS bears PRACH, the interference between SRS and PRACH is avoided as they have to be completely separated in the frequency domain, which is referred to as frequency division multiplexing, in the UpPTS time slot. Thus, UE transmits SRS with the uplink system bandwidth not occupied by PRACH of UpPTS. Simply, SRS is transmitted with the bandwidth not occupied by PRACH of UpPTS in the uplink system bandwidth. UE transmits SRS with the overall uplink system bandwidth if UpPTS does not bear PRACH. As shown in FIG. 2, UE transmits SRS with the overall uplink system bandwidth when UpPTS does not bear PRACH, for example, the bandwidth is BW0_UpPTS in the figure. UE transmits SRS with the uplink system bandwidth not occupied by PRACH of UpPTS, when UpPTS bears PRACH, for example, the bandwidth is BW0_offPRACH (BW0_PRACH being deducted from BW0_UpPTS) in the figure. BW0_UpPTS thus is much larger than BW0_Normal, and the latter is the largest bandwidth informed by the system as mentioned above and will not cause the power limit produced by UE.

Upon researches and practice of the prior art, the inventor considers that the following problems exist in the prior art:

UE transmits SRS with the largest available bandwidth when SRS is located in UpPTS time slot in the prior art, i.e. the bandwidth with which SRS is transmitted is extended. The maximum transmitting power of UE, however, is generally constant in the unit time. The larger the transmitting bandwidth is in the unit time, the less the power is on the unit bandwidth. In this situation, power limit may occur for the UE with unfavorable channel environment, and this problem directly results in a lower signal-to-noise ratio detected on these bandwidths. Thus, these UE have poor capability of detecting the channel information with a low signal-to-noise ratio, thereby it is hard to accurately detect the channel information.

SUMMARY OF THE INVENTION

The object of the embodiments in the present invention is to provide a method, system and device for determining the bandwidth of an uplink sounding reference signal to accurately detect the channel information.

In order to solve the above technical problem, a method, system and device for determining the bandwidth of an uplink sounding reference signal is provided in the embodiments of the present invention and realized as follow:

A method for determining the bandwidth of uplink sounding reference signal comprises:

determining whether SRS is transmitted with the uplink pilot time slot if SRS is transmitted with the largest bandwidth level;

transmitting SRS with the non-extensive SRS bandwidth if SRS is determined to be transmitted with the uplink pilot time slot, and the UE reaches the power limit.

A method for determining the bandwidth of an uplink sounding reference signal comprises:

detecting whether the UE reaches the power limit if the UE is informed to transmit SRS with the largest bandwidth level;

informing the UE to transmit SRS with the non-extensive SRS bandwidth when the UE reaches the power limit.

A system for determining the bandwidth of uplink sounding reference signal comprises a base station and a UE, wherein, the base station comprises:

a detecting unit configured to detect whether the UE reaches the power limit when the UE is informed to transmit SRS with the largest bandwidth level;

an informing unit configured to inform the UE to transmit SRS with the non-extensive SRS bandwidth when the detecting unit detects the UE reaches the power limit;

the UE comprises:

an uplink pilot time slot transmission determining unit configured to determine whether SRS is transmitted with the uplink pilot time slot;

a SRS transmitting unit configured to transmit SRS with the non-extensive SRS bandwidth when the uplink pilot time slot transmitting determining unit determines SRS to be transmitted with the uplink pilot time slot and the UE reaches the power limit.

A device for determining the bandwidth of an uplink sounding reference signal comprises:

an uplink pilot time slot transmission determining unit configured to determine whether SRS is transmitted with the uplink pilot time slot;

a SRS transmitting unit configured to transmit SRS with the non-extensive SRS bandwidth level when the uplink pilot time slot transmission determining unit determines SRS is transmitted with the uplink pilot time slot and the UE reaches the power limit.

A device for determining the bandwidth of an uplink sounding reference signal comprises:

a detecting unit configured to detect whether the UE reaches the power limit when the UE is informed to transmit SRS with the largest bandwidth level; an informing unit configured to inform the UE to transmit SRS with the non-extensive SRS bandwidth when the detecting unit detects the UE reaches the power limit.

According to the above technical solutions provided in the embodiments of the present invention, it is determined whether SRS is transmitted with the uplink pilot time slot, then SRS is transmitted with the SRS bandwidth level informed by the system when determined to be transmitted with the uplink pilot time slot and the UE reaches the power limit. Therefore, for part of UEs with unfavorable channel environment, in the case that SRS is transmitted with the uplink pilot time slot, since the bandwidth with which SRS is transmitted is not extended to the overall uplink system bandwidth and SRS is transmitted with the SRS bandwidth informed by the system, the signal-to-noise ratio detected in such bandwidth can be maintained. Thereby, the UE can accurately detect the channel information.

DETAILED DESCRIPTION OF EMBODIMENTS

The embodiments in the present invention provide a method, system and device for determining the bandwidth of an uplink sounding reference signal.

The embodiments in the present invention will be further illustrated in detail in conjunction with the accompanying drawings and embodiments hereinafter in order to make the person skilled in the art better understand the solutions of the present invention.

Figure 3:
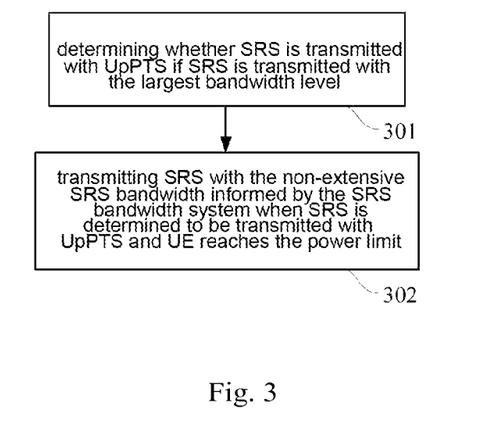
FIG. 3 is a flow chart showing one embodiment of the method in the present invention.

FIG. 3 shows an embodiment of the method for determining the bandwidth of an uplink sounding reference signal in the present invention. FIG. 3 shows the flow of this embodiment described at the UE side. As shown in FIG. 3, this method embodiment comprises:

S301: UE determines whether SRS is transmitted with UpPTS if SRS is transmitted with the largest bandwidth level.

As mentioned above, SRS can be transmitted with UpPTS or the normal uplink subframe. The transmitting mode in subsequent steps should be used in order to avoid the power limit caused when UE having unfavorable channel environment transmits SRS with the extensive largest bandwidth level in UpPTS. Firstly, it needs to determine whether SRS is transmitted with UpPTS.

Usually, the determined largest SRS bandwidth level with which SRS is transmitted can be marked as b=0. Regarding some other SRS bandwidth levels marked as b>0, they will not be described in the invention as they are not involved herein.

The transmission of SRS with largest SRS bandwidth level can be determined based on the an indication of the largest SRS bandwidth level received from the network side before UE transmits SRS with UpPTS each time or based on a stored indication of the largest SRS bandwidth level received from the network side for the first time.

S302: SRS is transmitted with the non-extensive SRS bandwidth when SRS is determined to be transmitted with UpPTS and UE reaches the power limit.

It should be explained in this step, the necessary step of UE reaching the power limit in the embodiment of the present invention can be performed by a plurality of methods as long as the determination can be made, and there is no limitation to this in the present invention.

In the prior art, the base station should indicate whether frequency hopping is enabled in SRS transmission for each UE, and the signaling indication indicating whether frequency hopping is enabled or not is only valid for the aforementioned bandwidth level marked as b>0. There is only one corresponding frequency domain position for the largest SRS bandwidth marked as b=0, i.e. the center of the SRS bandwidth is the center position of the uplink system bandwidth and is constant in the case of b=0. Therefore, the signaling indication is invalid in the case of b=0. In the present invention, the signaling indication as mentioned can be realized by multiplexing, but not limited to, this frequency hopping switch.

Therefore, the SRS bandwidth level corresponding to the signaling indication can be preset, then UE can determine whether the SRS bandwidth need to be extended or not according to the SRS bandwidth level corresponding to the signaling indication.

The determination that the UE reaches the power limit thus can be obtained by receiving the information of the signaling indication which indicates the SRS bandwidth is not extensive. For instance:

if the signaling indication is 1 bit, then the signaling indication of 1 bit has two states, e.g. 0 and 1, and one of them can be used to represent the SRS bandwidth is not extensive.

if the signaling indication is 2 bits, then the signaling indication of 2 bits has four states, e.g. 00, 01, 10 and 11, and one of the four states can be used to represent the SRS bandwidth is not extensive.

There may be various types of the non-extensive SRS bandwidth as long as this bandwidth is not obtained by extending the SRS bandwidth. Several specific types of non-extensive SRS bandwidths are provided herein and can be determined by the following Table 1 to Table 4.

TABLE 1

SRS bandwidth when $6 \leq N_{RB}^{UL} \leq 40$ (b = 0)

| SRS bandwidth configuration | SRS bandwidth b = 0 $m_{SRS,b}$ |
|---|---|
| 0 | 36 |
| 1 | 32 |
| 2 | 24 |
| 3 | 20 |
| 4 | 16 |
| 5 | 12 |
| 6 | 8 |
| 7 | 4 |

TABLE 2

SRS bandwidth when $40 < N_{RB}^{UL} \leq 60$ (b = 0)

| SRS bandwidth configuration | SRS bandwidth b = 0 $m_{SRS,b}$ |
|---|---|
| 0 | 48 |
| 1 | 48 |
| 2 | 40 |
| 3 | 36 |
| 4 | 32 |
| 5 | 24 |
| 6 | 20 |
| 7 | 16 |

TABLE 3

SRS bandwidth when $60 < N_{RB}^{UL} \leq 80$ (b = 0)

| SRS bandwidth configuration | SRS bandwidth b = 0 $m_{SRS,b}$ |
|---|---|
| 0 | 72 |
| 1 | 64 |
| 2 | 60 |
| 3 | 48 |
| 4 | 48 |
| 5 | 40 |
| 6 | 36 |
| 7 | 32 |

TABLE 4

SRS bandwidth when $80 < N_{RB}^{UL} \leq 110$ (b = 0)

| SRS bandwidth configuration | SRS bandwidth b = 0 $m_{SRS,b}$ |
|---|---|
| 0 | 96 |
| 1 | 96 |
| 2 | 80 |
| 3 | 72 |
| 4 | 64 |
| 5 | 60 |
| 6 | 48 |
| 7 | 48 |

The above four tables show different SRS bandwidths defined for different system bandwidths.

Wherein $N_{RB}^{UL}$ is the overall uplink bandwidth represented by Resource Block (RB) which is the minimum unit of resources distributed in the frequency domain and one RB frequency band width is 180 kHz in the existing prescription.

All these four tables are when b=0 that represents the largest bandwidth level.

The values in the column of SRS bandwidth configuration determine $m_{SRS,b}$ in respective rows, i.e. the values determine specific SRS bandwidth with unit in RB. These eight types of different SRS bandwidth configurations belong to cell-level SRS bandwidth configurations and can be obtained by UE from preliminary broadcast notification of the cells.

Embodiments will be taken to illustrate that SRS is transmitted with non-extensive SRS bandwidth as shown in Table 1 to Table 4.

For instance, Table 1 will be inquired when $6 \leq N_{RB}^{UL} \leq 40$. The $m_{SRS,b}$ is 36 in a respective row in Table 1 if the cell-level SRS bandwidth configuration is 0, i.e. SRS is transmitted with the bandwidth of 36RB in UpPTS.

For instance, Table 2 will be inquired when $40 < N_{RB}^{UL} \leq 60$. The $m_{SRS,b}$ is 48 in a respective row in Table 2 if the cell-level SRS bandwidth configuration is 1, i.e. SRS is transmitted with the bandwidth of 48RB in UpPTS.

For instance, Table 3 will be inquired when $60 < N_{RB}^{UL} \leq 80$. The $m_{SRS,b}$ is 60 in a respective row in Table 3 if the cell-level SRS bandwidth configuration is 2, i.e. SRS is transmitted with the bandwidth of 48RB in UpPTS.

For instance, Table 4 will be inquired when $80 < N_{RB}^{UL} \leq 110$. The $m_{SRS,b}$ is 64 in respective row in Table 4 if the cell-level SRS bandwidth configuration is 3, i.e. SRS is transmitted with the bandwidth of 48RB in UpPTS.

The other situations where the bandwidth with which SRS is transmitted is determined according to Table 1 to Table 4 are similar to the above, and will not be illustrated one by one.

According to the above embodiments in the present invention, for a part of UEs with unfavorable channel environment, in the case that SRS is transmitted with the uplink pilot time slot, since the bandwidth with which SRS is transmitted is not extended to the overall uplink system bandwidth and SRS is transmitted with the SRS bandwidth non-extensive SRS bandwidth, the signal-to-noise ratio detected in such bandwidth can be maintained. Thereby, the UE can accurately detect the channel information.

When SRS is determined to be transmitted with UpPTS, and UE does not reach the power limit, the embodiments in the present invention further comprise:

S303: SRS is transmitted with the SRS bandwidth corresponding to the preset signaling indication in UpPTS.

As aforementioned, for the signaling indication that is 1 bit, if this signaling indication of 1 bit has two states, e.g. 0 and 1, one of the two states can be used to represent that the SRS bandwidth is not extensive. The other state also can be used to represent that the SRS bandwidth is extended to the largest extensible bandwidth of system uplink, which indicates UE does not reach the power limit.

Similarly, as mentioned above, for the signaling indication that is 2 bits, if this signaling indication of 2 bits has four states, e.g. 00, 01, 10 and 11, one of the four states can be used to represent that the SRS bandwidth is not extensive. One of the other three states can also be used to represent that the SRS bandwidth is extended to the largest extensible bandwidth of system uplink, which can indicate UE does not reach the power limit.

Particularly, for the situation where the signaling indication is 2 bits, the other idle states of the signaling indication of 2 bits also can be used to represent that the SRS bandwidth is extended to other preset bandwidths. As above, 11 and 00 represent that the two states in which the SRS bandwidth is extended to the largest extensible system uplink bandwidth and the SRS bandwidth is not extensive, respectively, then the idle 01 and 10 can represent that the SRS bandwidth can be extended to other preset bandwidths respectively, which also can indicate UE does not reach the power limit.

UE is informed of the bandwidth with which SRS is transmitted is extended in UpPTS by setting the frequency hopping indication switching if the power limit is not reached. The specific extending method is similar to that in the prior art, and unnecessary details will not be given herein.

Several modes to preset the signaling indication are listed below:

Mode 1: if the signaling indication is 1 bit information, the SRS bandwidth extension can be represented with the signaling indication of 1 bit. For instance, the information bit can be set to be 1 (or set to be 0) so as to represent the SRS bandwidth extension.

Mode 2: the SRS bandwidth extension can be represented with the signaling indication of 2 bits when the signaling indication is 2 bits information. For instance, the information bit can be set to be 11 (or set to be 00, or 01, or 10) to represent the SRS bandwidth extension.

Mode 3: the largest bandwidth level can be further controlled more finely on the basis of mode 2 when the signaling indication is 2 bits information. For instance, the other SRS bandwidths are represented with the idle states of the signaling indication of 2 bits, as shown in the following Table 5 to Table 10.

Next, several modes for more finely controlling the SRS bandwidth level with the signaling indication in Table 5 to Table 10.

TABLE 5

Corresponding relation between the signaling indication and the bandwidth with which SRS is transmitted when the uplink system bandwidth is $N_{RB}^{UL} = 6RB$

| signaling indication value | SRS bandwidth b = 0 $m_{SRS, b}$ |
|---|---|
| 00 | the actually informed largest bandwidth (non-extensive) |
| 01 | N/A |
| 10 | N/A |
| 11 | $N_{RB}^{UL} - 6N_{RA}$ |

In this table, $N_{RA}$ PRACHs occupy $6*N_{RA}$ RBs in total as one PRACH occupies six RBs. Thus, the bandwidth with which SRS is transmitted in UpPTS is obtained by subtracting the $6*N_{RA}$ RBs occupied by $N_{RA}$ PRACHs from the overall uplink system bandwidth $N_{RB}^{UL}$. Particularly, $N_{RB}^{UL} - 6N_{RA} = N_{RB}^{UL}$ in the situation where $N_{RA}=0$, i.e. the overall uplink system bandwidth is used. The following tables are similar.

TABLE 6

Corresponding relation between the signaling indication and the bandwidth with which SRS is transmitted when the uplink system bandwidth is $N_{RB}^{UL} = 15RB$

| signaling indication value | SRS bandwidth b = 0 $m_{SRS, b}$ |
|---|---|
| 00 | the actually informed largest bandwidth (non-extensive) |
| 01 | 8 |
| 10 | 12 |
| 11 | $N_{RB}^{UL} - 6N_{RA}$ |

TABLE 7

Corresponding relation between the signaling indication and the bandwidth with which SRS is transmitted when the uplink system bandwidth is $N_{RB}^{UL} = 25RB$

| signaling indication value | SRS bandwidth b = 0 $m_{SRS, b}$ |
|---|---|
| 00 | the actually informed largest bandwidth (non-extensive) |
| 01 | 16 |
| 10 | 20 |
| 11 | $N_{RB}^{UL} - 6N_{RA}$ |

TABLE 8

Corresponding relation between the signaling indication and the bandwidth with which SRS is transmitted when the uplink system bandwidth is $N_{RB}^{UL} = 50RB$

| signaling indication value | SRS bandwidth b = 0 $m_{SRS, b}$ |
|---|---|
| 00 | the actually informed largest bandwidth (non-extensive) |
| 01 | 32 |
| 10 | 40 |
| 11 | $N_{RB}^{UL} - 6N_{RA}$ |

TABLE 9

Corresponding relation between the signaling indication and the bandwidth with which SRS is transmitted when the uplink system bandwidth is $N_{RB}^{UL} = 75RB$

| signaling indication value | SRS bandwidth b = 0 $m_{SRS, b}$ |
|---|---|
| 00 | the actually informed largest bandwidth (non-extensive) |
| 01 | 48 |
| 10 | 60 |
| 11 | $N_{RB}^{UL} - 6N_{RA}$ |

TABLE 10

Corresponding relation between the signaling indication and the bandwidth with which SRS is transmitted when the uplink system bandwidth is $N_{RB}^{UL} = 100RB$

| signaling indication value | SRS bandwidth b = 0 $m_{SRS, b}$ |
|---|---|
| 00 | the actually informed largest bandwidth (non-extensive) |
| 01 | 64 |
| 10 | 80 |
| 11 | $N_{RB}^{UL} - 6N_{RA}$ |

It should be explained that only several modes of setting the signaling indication are listed above, but the person skilled in the art should understand that such examples are not limited but varied.

In S303, UE can adjust the bandwidth with which SRS is transmitted in UpPTS by indicating the bandwidth level with the unused state of the signaling indication in the situation where b=0, power limit thus may be avoided and the TDD system performance may be further optimized.

Next, an embodiment of the method for determining the bandwidth of uplink sounding reference signal in the present invention will be described from the perspective of the base station.

Figure 4:
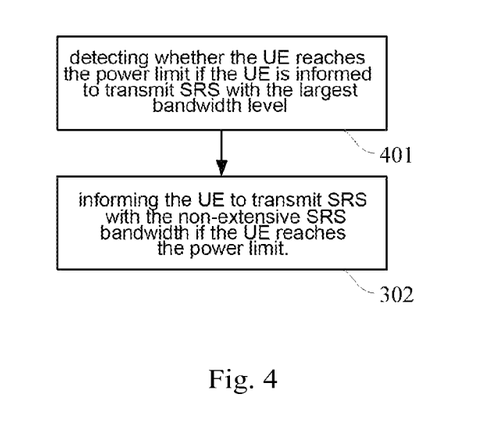
FIG. 4 is a flow chart showing one embodiment of the method in the present invention.

FIG. 4 shows the flow of this embodiment, as shown in FIG. 4, the method comprises the following.

S401: the base station detects whether the UE reaches the power limit if the UE is informed to transmit SRS with the largest bandwidth level.

Usually, the determined largest SRS bandwidth level with which SRS is transmitted can be marked as b=0. There may be some other SRS bandwidth levels where b>0.

S402: the base station informs the UE to transmit SRS with the non-extensive SRS bandwidth if the UE reaches the power limit.

It should be explained in this step, the necessary step of UE reaching the power limit in the embodiment of the present invention can be performed by a plurality of methods as long as the determination can be made, and there is no limitation to this in the present invention.

Specifically, the UE can be informed through signaling indication to transmit SRS with the non-extensive SRS bandwidth.

In the prior art, the base station should indicate whether frequency hopping is enabled in SRS transmission for each UE, and the signaling indication indicating whether frequency hopping is enabled or not is merely valid for the aforementioned bandwidth level marked as b>0. There is only one corresponding frequency domain position for the largest SRS bandwidth marked as b=0, i.e. the center of the SRS bandwidth is the center position of the uplink system bandwidth and is constant in the case of b=0. Therefore, the signaling indication is invalid in the case of b=0.

Therefore, the SRS bandwidth level corresponding to the signaling indication can be preset, and then the base station can inform UE of whether to extend the SRS bandwidth according to the SRS bandwidth level corresponding to the signaling indication.

The determination that the UE reaches the power limit thus can be obtained by transmitting the information of the signaling indication that indicates the SRS bandwidth is not extensive. For instance:

for the signaling indication that is 1 bit, the signaling indication of 1 bit has two states, e.g. 0 and 1, and one of the two states can be used to represent the SRS bandwidth is not extensive.

For the signaling indication that is 2 bits, the signaling indication of 2 bits has four states, e.g. 00, 01, 10 and 11, and one of the four states can be used to represent the SRS bandwidth is not extensive.

There may be various types of the non-extensive SRS bandwidth as long as this bandwidth is not obtained by extending the SRS bandwidth. Specific examples can refer to Table 1 to Table 4, and unnecessary details will be ignored.

Particularly, when the UE is detected not to reach the power limit, this method embodiment can further comprise:

S403: the UE is indicated to transmit SRS with corresponding bandwidth in UpPTS according to the preset signaling indication.

As aforementioned, if the signaling indication is 1 bit, then the signaling indication of 1 bit has two states, e.g. 0 and 1, and any one of them can be used to represent the SRS bandwidth is not extensive. The other state also can be used to represent that the SRS bandwidth is extended to the largest extensible bandwidth of system uplink, which indicates UE does not reach the power limit.

Similarly, as mentioned above, if the signaling indication is 2 bits, then the signaling indication of 2 bits has four states, e.g. 00, 01, 10 and 11, and one of the four states can be used to represent that the SRS bandwidth is not extensive. One of the other three states can also be used to represent that the SRS bandwidth is extended to the largest extensible bandwidth of system uplink, which can indicate UE does not reach the power limit.

Particularly, for the situation where the signaling indication is 2 bits, the other idle states of the signaling indication of 2 bits also can be used to represent that the SRS bandwidth is extended to other preset bandwidths. As described above, 11 and 00 represent the two states in which the SRS bandwidth is extended to the largest extensible system uplink bandwidth and the SRS bandwidth is not extensive, respectively, then the idle 01 and 10 can represent that the SRS bandwidth can be extended to other preset bandwidths respectively, which can also indicate that UE does not reach the power limit.

Consequently in this method embodiment, for the signaling indication:

if the signaling indication is 1 bit, two states of this signaling indication of 1 bit represent that the SRS bandwidth is extended to the largest extensible bandwidth of system uplink and the SRS bandwidth is not extensive; or if the signaling indication is 2 bits, two states of this signaling indication of 2 bits represent that the SRS bandwidth is extended to the largest extensible bandwidth of system uplink and the SRS bandwidth is not extensive.

If the signaling indication is 2 bits, this embodiment of the method can further comprise:

the idle states of the signaling indication of 2 bits represents that the SRS bandwidth is extended to other preset bandwidths.

In this embodiment of the method, the two states of this signaling indication of 2 bits represent that the SRS bandwidth is extended to the largest extensible bandwidth of system uplink and the SRS bandwidth is not extensive, and the idle states of the signaling indication of 2 bits represent that the SRS bandwidth is extended to other preset bandwidths, which are similar to those in the tables from Table 5 to Table 10 and also can be determined according to any one of tables from Table 5 to Table 10. Unnecessary details will be ignored.

Figure 5:
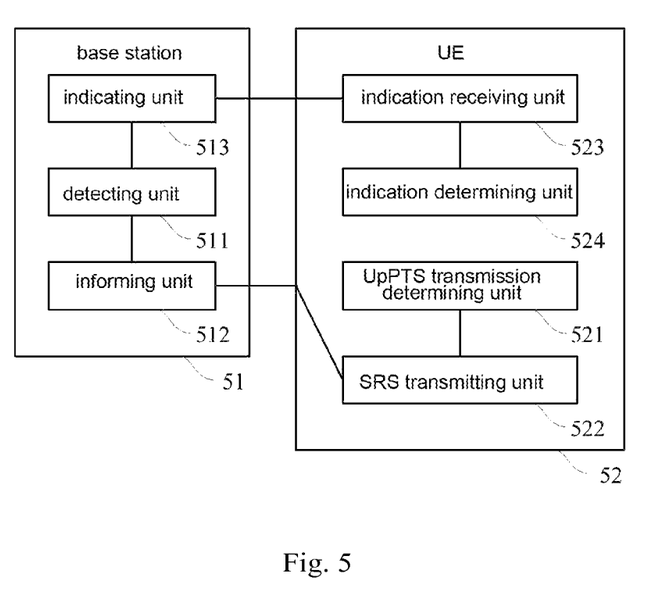
FIG. 5 is a block diagram showing an embodiment of a system in the present invention.

Next, the embodiment of the system for transmitting the uplink sounding reference signal in the present invention will be described. FIG. 5 shows a block diagram of this embodiment. As shown in FIG. 5, the system embodiment comprises a base station 51 and a UE 52, wherein:

the base station 51 comprises:

a detecting unit 511 configured to detect whether the UE reaches the power limit when the UE is informed to transmit SRS with the largest bandwidth level;

an informing unit 512 configured to inform the UE to transmit SRS with the non-extensive SRS bandwidth when the detecting unit 511 detects the UE reaches the power limit.

the UE 52 comprises:

UpPTS transmission determining unit 521 configured to determine whether SRS is transmitted with UpPTS;

SRS transmitting unit 522 configured to transmit SRS with the non-extensive SRS bandwidth when the UpPTS transmission determining unit determines that SRS is transmitted with UpPTS and UE reaches the power limit.

Preferably, in the system, the informing unit 512 informs the UE to transmit SRS with the non-extensive SRS bandwidth by the signaling indication.

Preferably, in the system, when the detecting unit 511 detects that the UE does not reach the power limit, the base station further comprises:

an indicating unit 513 configured to indicate that the UE transmits SRS with corresponding bandwidth in UpPTS according to the preset signaling indication.

Preferably, in the system, for the signaling indication preset in the indicating unit 513 of the base station:

if the signaling indication is 1 bit, two states of this signaling indication of 1 bit represent that the SRS bandwidth is extended to the largest extensible bandwidth of system uplink and the SRS bandwidth is not extensive; or if the signaling indication is 2 bits, two states of this signaling indication of 2 bits represent that the SRS bandwidth is extended to the largest extensible bandwidth of system uplink and the SRS bandwidth is not extensive.

Preferably, in the system, if the signaling indication preset in the indicating unit 513 is 2 bits, the idle states of the signaling indication of 2 bits represent that the SRS bandwidth is extended to other preset bandwidths.

Preferably, in the system, the two states of this signaling indication of 2 bits represent that the SRS bandwidth is extended to the largest extensible bandwidth of system uplink and the SRS bandwidth is not extensive, and the idle states of the signaling indication of 2 bits represent that the SRS bandwidth is extended to other preset bandwidths, which include any one of the tables from Table 5 to Table 10.

Preferably, in the system, the bandwidth depends upon any one of the tables from Table 1 to Table 4 when the UE transmits SRS with the non-extensive SRS bandwidth.

Preferably, when the detecting unit 511 detects the UE reaches the power limit, the UE 52 in the system further comprises:

an indication receiving unit 523 configured to receive the transmitted signaling indication;

an indication determining unit 524 configured to determine the SRS bandwidth corresponding to the signaling indication transmitted from the indication receiving unit.

The method for determining the bandwidth of the uplink sounding reference signal realized with the above embodiment of system is similar to the foregoing method, and unnecessary details will be ignored.

Figure 6:
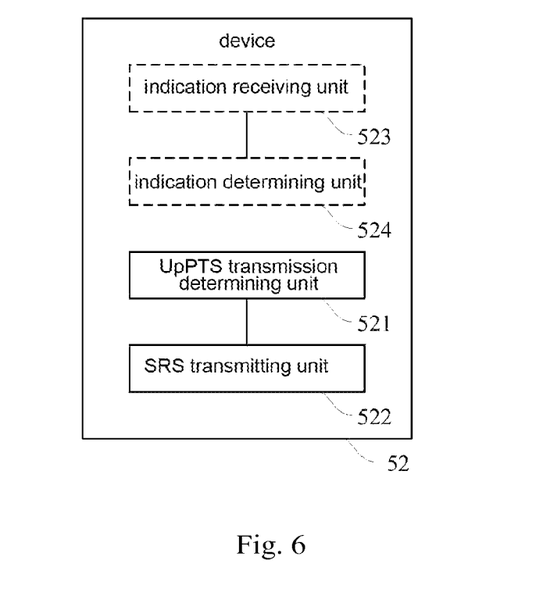
FIG. 6 is a block diagram showing one embodiment of a device in the present invention.

Next, the embodiment of the device for determining the bandwidth of the uplink sounding reference signal in the present invention will be described. FIG. 6 shows a block diagram of this embodiment. As shown in FIG. 6, the embodiment of the device comprises:

a UpPTS transmission determining unit 521 configured to determine whether SRS is transmitted with UpPTS;

a SRS transmitting unit 522 configured to transmit SRS with the non-extensive SRS bandwidth level when the UpPTS transmission determining unit 521 determines that SRS is transmitted with UpPTS and UE reaches the power limit.

Preferably, the device further can comprise:

an indication receiving unit 523 configured to receive the transmitted signaling indication, the received signaling indication is the signaling indication transmitted from the base station in the case that the UE including the device is detected not to reach the power limit;

an indication determining unit 524 configured to determine the SRS bandwidth corresponding to the signaling indication transmitted from the indication receiving unit. Preferably, the device is located in the UE.

Figure 7:
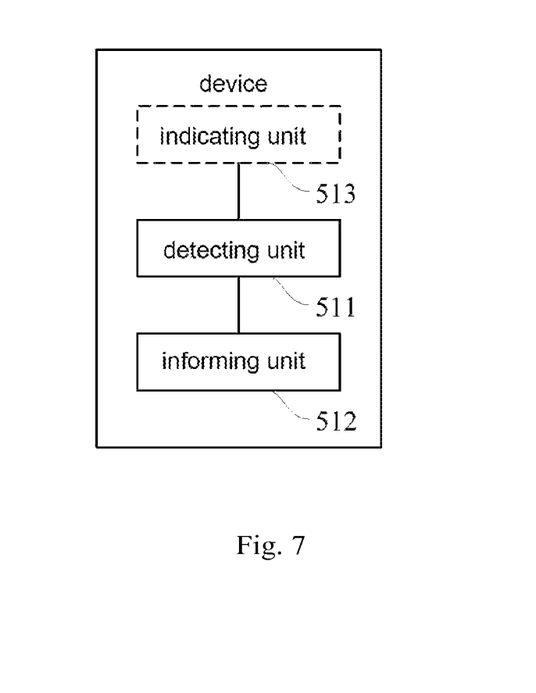
FIG. 7 is a block diagram showing one embodiment of a device in the present invention.

Next, the embodiment of the device for determining the bandwidth of the uplink sounding reference signal in the present invention will be described. FIG. 7 shows a block diagram of this embodiment. As shown in FIG. 7, the embodiment of the device comprises:

a detecting unit 511 configured to detect whether the UE reaches the power limit when the UE is informed to transmit SRS with the largest bandwidth level;

an informing unit 512 configured to inform the UE to transmit SRS with the non-extensive SRS bandwidth when the detecting unit detects that the UE reaches the power limit;

Preferably, in the device, the informing unit 512 informs the UE to transmit SRS with the non-extensive SRS bandwidth by the signaling indication.

Preferably, in the system, when the detecting unit 511 detects that the UE does not reach the power limit, the device further comprises:

an indicating unit 513 configured to indicate that the UE transmits SRS with corresponding bandwidth in UpPTS according to the preset signaling indication.

Preferably, the device is included in the base station.

The method for determining the bandwidth of the uplink sounding reference signal realized with the above embodiment of device is similar to the foregoing method, and unnecessary details will be ignored.

According to the abovementioned embodiments, if SRS is transmitted with the SRS bandwidth level, then it needs to determine whether SRS is transmitted with the uplink pilot time slot. SRS is transmitted with the non-extensive SRS bandwidth when determined to be transmitted with the uplink pilot time slot and the UE reaches the power limit. Therefore, for a part of UEs with unfavorable channel environment, in the case that SRS is transmitted with the uplink pilot time slot, since the bandwidth with which SRS is transmitted is not extended to the overall uplink system bandwidth and SRS is transmitted with the SRS bandwidth informed by the system, the signal-to-noise ratio detected in such bandwidth can be maintained. Thereby, the UE can accurately detect the channel information.

In addition, if UE does not reach the power limit, UE is informed that the bandwidth with which SRS is transmitted is extended in UpPTS by setting the frequency hopping indication switch. Moreover, UE can adjust the bandwidth with which SRS is transmitted in UpPTS by indicating the bandwidth level with the unused state of the signaling indication in the situation where b=0, power limit thus may be avoided and the TDD system performance may be further optimized.

The person ordinarily skilled in the art should understand that all of or part of the steps included in the exemplary methods can be performed with related hardware instructed by related program that can be stored in a computer readable storage medium. One of the steps in the exemplary method or combination of many steps can be performed when the program is executed.

Furthermore, respective functional units in each embodiment of the present invention can be integrated into one processing module, or can be configured as individual modules, or two or above units are integrated into one module. The integrated module may be realized in the form of hardware or software functional module. The integrated module also can be stored in a computer readable storage medium if it is realized in the form of a software functional module and sold or used as a product.

The aforementioned storage medium can be a read only memory, disk, compact disk, etc.

Above descriptions are merely preferred embodiments of the present invention. It should be noted that the person ordinarily skilled in the art, without departing from the principle of the present invention, improvements and embellishments of the present invention should also fall into the protection scope of the present invention.

What is claimed is:

1. A method for determining the transmission bandwidth of an uplink sounding reference signal, comprising:

determining whether a sounding reference signal (SRS) is transmitted with an uplink pilot time slot (UpPTS) if the SRS is transmitted with a largest bandwidth level;

transmitting the SRS with a non-extensive SRS bandwidth if the SRS is determined to be transmitted with the UpPTS and a user equipment (UE) reaches a power limit, the SRS bandwidth including cell-level SRS bandwidth configurations, the SRS bandwidth being obtained by the UE from preliminary broadcast notification of cells, wherein the non-extensive SRS bandwidth is determined by any one of tables, Table 1 to Table 4 comprising:

TABLE 1

SRS bandwidth when $6 \leq N_{RB}^{UL} \leq 40$

| SRS bandwidth configuration | SRS bandwidth b = 0 $m_{SRS,b}$ |
|---|---|
| 0 | 36 |
| 1 | 32 |
| 2 | 24 |
| 3 | 20 |
| 4 | 16 |
| 5 | 12 |
| 6 | 8 |
| 7 | 4 |

TABLE 2

SRS bandwidth when $40 < N_{RB}^{UL} \leq 60$

| SRS bandwidth configuration | SRS bandwidth b = 0 $m_{SRS,b}$ |
|---|---|
| 0 | 48 |
| 1 | 48 |
| 2 | 40 |
| 3 | 36 |
| 4 | 32 |
| 5 | 24 |
| 6 | 20 |
| 7 | 16 |

TABLE 3

SRS bandwidth when $60 < N_{RB}^{UL} \leq 80$

| SRS bandwidth configuration | SRS bandwidth b = 0 $m_{SRS,b}$ |
|---|---|
| 0 | 72 |
| 1 | 64 |
| 2 | 60 |
| 3 | 48 |
| 4 | 48 |
| 5 | 40 |
| 6 | 36 |
| 7 | 32 |

TABLE 4

SRS bandwidth when $80 < N_{RB}^{UL} \leq 110$

| SRS bandwidth configuration | SRS bandwidth b = 0 $m_{SRS,b}$ |
|---|---|
| 0 | 96 |
| 1 | 96 |
| 2 | 80 |
| 3 | 72 |

TABLE 4-continued

SRS bandwidth when $80 < N_{RB}^{UL} \leq 110$

| SRS bandwidth configuration | SRS bandwidth b = 0 $m_{SRS,b}$ |
|---|---|
| 4 | 64 |
| 5 | 60 |
| 6 | 48 |
| 7 | 48 | wherein $N_{RB}^{UL}$ is a overall uplink bandwidth represented by Resource Block, b=0 represents the largest bandwidth level, mSRS,b represents the bandwidth with which the SRS is transmitted, and the SRS bandwidth configuration comprises cell-level SRS bandwidth configuration.

detecting a signal-to-noise (SNR) ratio in the SRS bandwidth; and maintaining the SNR ratio as detected in the SRS bandwidth, thereby permitting the UE to detect channel information more accurately, wherein the largest bandwidth level includes an indication of the largest SRS bandwidth level received from a network side before transmitting the SRS with the uplink pilot time slot each time, or a stored indication of the largest bandwidth level indicating the largest SRS bandwidth level received from the network side.

2. The method according to claim 1, wherein, if the UE reaches the power limit, a signaling indication received from a base station indicates that SRS is transmitted with the non-extensive bandwidth, or if the UE is detected not having reached the power limit, transmitting the SRS in the uplink pilot time slot with the SRS bandwidth corresponding to a preset signaling indication.

3. The method according to claim 2, wherein for the signaling indication, if the signaling indication is represented as 1 bit information, two states of the 1 bit information represent that the SRS bandwidth is extended to the largest extensible bandwidth of system uplink and the SRS bandwidth is not extensive respectively; or if the signaling indication is represented as 2 bits information, two states of the 2 bits information represent that the SRS bandwidth is extended to the largest extensible bandwidth of system uplink and the SRS bandwidth is not extensive.

4. A method for determining a bandwidth of an uplink sounding reference signal, comprising:

detecting whether a user equipment (UE) reaches a power limit if the UE is informed to transmit a sounding reference signal (SRS) with a largest bandwidth level;

informing the UE to transmit the SRS with a non-extensive SRS bandwidth when the UE reaches the power limit, the SRS bandwidth including cell-level SRS bandwidth configurations, the SRS bandwidth being obtained by the UE from preliminary broadcast notification of cells, wherein the non-extensive SRS bandwidth is determined by any one of tables, Table 1 to Table 4, comprising:

TABLE 1

SRS bandwidth when $6 \leq N_{RB}^{UL} \leq 40$

| SRS bandwidth configuration | SRS bandwidth b = 0 $m_{SRS,b}$ |
|---|---|
| 0 | 36 |
| 1 | 32 |
| 2 | 24 |
| 3 | 20 |
| 4 | 16 |
| 5 | 12 |
| 6 | 8 |
| 7 | 4 |

TABLE 2

SRS bandwidth when $40 < N_{RB}^{UL} \leq 60$

| SRS bandwidth configuration | SRS bandwidth b = 0 $m_{SRS,b}$ |
|---|---|
| 0 | 48 |
| 1 | 48 |
| 2 | 40 |
| 3 | 36 |
| 4 | 32 |
| 5 | 24 |
| 6 | 20 |
| 7 | 16 |

TABLE 3

SRS bandwidth when $60 < N_{RB}^{UL} \leq 80$

| SRS bandwidth configuration | SRS bandwidth b = 0 $m_{SRS,b}$ |
|---|---|
| 0 | 72 |
| 1 | 64 |
| 2 | 60 |
| 3 | 48 |
| 4 | 48 |
| 5 | 40 |
| 6 | 36 |
| 7 | 32 |

TABLE 4

SRS bandwidth when $80 < N_{RB}^{UL} \leq 110$

| SRS bandwidth configuration | SRS bandwidth b = 0 $m_{SRS,b}$ |
|---|---|
| 0 | 96 |
| 1 | 96 |
| 2 | 80 |
| 3 | 72 |
| 4 | 64 |
| 5 | 60 |
| 6 | 48 |
| 7 | 48 | wherein $N_{RB}^{UL}$ is a overall uplink bandwidth represented by Resource Block, b=0 represents the largest bandwidth level, mSRS,b represents the bandwidth with which the SRS is transmitted, and the SRS bandwidth configuration comprises cell-level SRS bandwidth configuration;

detecting a signal-to-noise (SNR) ratio in the SRS bandwidth; and maintaining the SNR ratio as detected in the SRS bandwidth, thereby permitting the UE to detect channel information more accurately, wherein the largest bandwidth level includes an indication of the largest SRS bandwidth level received from a network side before transmitting the SRS with the uplink pilot time slot each time, or a stored indication of the largest bandwidth level indicating the largest SRS bandwidth level received from the network side.

5. The method according to claim 4, wherein the step of informing the UE to transmit the SRS with the non-extensive SRS bandwidth comprises:

informing the UE to transmit the SRS with the non-extensive SRS bandwidth by a signaling indication, when the UE is detected not having reached the power limit, the method further including the step of:

indicating the UE to transmit the SRS with a corresponding bandwidth in an uplink pilot time slot according to a preset signaling indication.

6. The method according to claim 5, wherein the signaling indication further comprises:

determining if the signaling indication is 1 bit, two states of the signaling indication of 1 bit thereby representing that the SRS bandwidth is extended to the largest extensible bandwidth of system uplink and the SRS bandwidth is not extensive; or determining if the signaling indication is 2 bits, two states of the signaling indication of 2 bits thereby representing that the SRS bandwidth is extended to the largest extensible bandwidth of system uplink and the SRS bandwidth is not extensive.

7. A system for determining a bandwidth of an uplink sounding reference signal, comprising a base station and a user equipment (UE), wherein, the base station comprises:

a detecting unit configured to detect whether the UE reaches a power limit when the UE is informed to transmit a sounding reference signal (SRS) with the largest bandwidth level;

an informing unit configured to informing the UE to transmit the SRS with a non-extensive SRS bandwidth when the detecting unit detects the UE reaches a power limit;

the UE comprises:

an uplink pilot time slot transmission determining unit configured to determine whether the SRS is transmitted with an uplink pilot time slot;

an SRS transmitting unit configured to transmit the SRS with the non-extensive SRS bandwidth when the uplink pilot time slot transmission determining unit determines that the SRS is transmitted with the uplink pilot time slot and the UE reaches the power limit, the SRS bandwidth including cell-level SRS bandwidth configurations, the SRS bandwidth being obtained by the UE from preliminary broadcast notification of cells, wherein the non-extensive SRS bandwidth is determined by any one of tables, Table 1 to Table 4 comprising:

TABLE 1

SRS bandwidth when $6 \leq N_{RB}^{UL} \leq 40$

| SRS bandwidth configuration | SRS bandwidth b = 0 $m_{SRS,b}$ |
|---|---|
| 0 | 36 |
| 1 | 32 |
| 2 | 24 |
| 3 | 20 |
| 4 | 16 |
| 5 | 12 |
| 6 | 8 |
| 7 | 4 |

TABLE 2

SRS bandwidth when $40 < N_{RB}^{UL} \leq 60$

| SRS bandwidth configuration | SRS bandwidth b = 0 $m_{SRS,b}$ |
|---|---|
| 0 | 48 |
| 1 | 48 |
| 2 | 40 |
| 3 | 36 |
| 4 | 32 |
| 5 | 24 |
| 6 | 20 |
| 7 | 16 |

TABLE 3

SRS bandwidth when $60 < N_{RB}^{UL} \leq 80$

| SRS bandwidth configuration | SRS bandwidth b = 0 $m_{SRS,b}$ |
|---|---|
| 0 | 72 |
| 1 | 64 |
| 2 | 60 |
| 3 | 48 |
| 4 | 48 |
| 5 | 40 |
| 6 | 36 |
| 7 | 32 |

TABLE 4

SRS bandwidth when $80 < N_{RB}^{UL} \leq 110$

| SRS bandwidth configuration | SRS bandwidth b = 0 $m_{SRS,b}$ |
|---|---|
| 0 | 96 |
| 1 | 96 |
| 2 | 80 |
| 3 | 72 |
| 4 | 64 |
| 5 | 60 |
| 6 | 48 |
| 7 | 48 | wherein $N_{RB}^{UL}$ is a overall uplink bandwidth represented by Resource Block, b=0 represents the largest bandwidth level, mSRS,b represents the bandwidth with which the SRS is transmitted, and the SRS bandwidth configuration comprises cell-level SRS bandwidth configuration, thereby permitting the UE to detect channel information more accurately by maintaining a signal-to-noise (SNR) ratio in the SRS bandwidth, wherein the largest bandwidth level includes an indication of the largest SRS bandwidth level received from a network side before transmitting the SRS with the uplink pilot time slot each time, or a stored indication of the largest bandwidth level indicating the largest SRS bandwidth level received from the network side.

8. The system according to claim 7, wherein the informing unit informs the UE to transmit the SRS with the non-extensive SRS bandwidth by a signaling indication, or
when the detecting unit detects the UE not reaching the power limit, the base station further including:
an indicating unit configured to indicate that the UE transmits the SRS in the uplink pilot time slot with corresponding bandwidth according to a preset signaling indication.

9. The system according to claim 8, wherein for the signaling indication preset in the indicating unit of the base station, if the signaling indication is 1 bit, two states of the signaling indication of 1 bit represent that the SRS bandwidth is extended to the largest extensible bandwidth of system uplink and the SRS bandwidth is not extensive; or if the signaling indication is 2 bits, two states of the signaling indication of 2 bits represent that the SRS bandwidth is extended to the largest extensible bandwidth of system uplink and the SRS bandwidth is not extensive.

10. The system according to claim 9, wherein, when the detecting unit detects that the UE reaches the power limit, the UE further comprises:
an indication receiving unit configured to receive a transmitted signaling indication;
an indication determining unit configured to determine the SRS bandwidth corresponding to the signaling indication transmitted from the indication receiving unit.

11. A device for determining a bandwidth of an uplink sounding reference signal, comprising:
an uplink pilot time slot transmission determining unit configured to determine whether a sounding reference signal (SRS) is transmitted with an uplink pilot time slot;
an SRS transmitting unit configured to transmit the SRS with a non-extensive SRS bandwidth level when the uplink pilot time slot transmission determining unit determines that the SRS is transmitted with the uplink pilot time slot at the largest bandwidth level and user equipment (UE) reaches a power limit, the SRS bandwidth including cell-level SRS bandwidth configurations obtained by the UE from preliminary broadcast notification of the cells, wherein the non-extensive SRS bandwidth is determined by any one of the tables, Table 1 to Table 4 comprising:

TABLE 1

SRS bandwidth when $6 \leq N_{RB}^{UL} \leq 40$

| SRS bandwidth configuration | SRS bandwidth b = 0 $m_{SRS,b}$ |
|---|---|
| 0 | 36 |
| 1 | 32 |
| 2 | 24 |
| 3 | 20 |
| 4 | 16 |
| 5 | 12 |
| 6 | 8 |
| 7 | 4 |

TABLE 2

SRS bandwidth when $40 < N_{RB}^{UL} \leq 60$

| SRS bandwidth configuration | SRS bandwidth b = 0 $m_{SRS,b}$ |
|---|---|
| 0 | 48 |
| 1 | 48 |
| 2 | 40 |
| 3 | 36 |
| 4 | 32 |
| 5 | 24 |
| 6 | 20 |
| 7 | 16 |

TABLE 3

SRS bandwidth when $60 < N_{RB}^{UL} \leq 80$

| SRS bandwidth configuration | SRS bandwidth b = 0 $m_{SRS,b}$ |
|---|---|
| 0 | 72 |
| 1 | 64 |
| 2 | 60 |
| 3 | 48 |
| 4 | 48 |
| 5 | 40 |
| 6 | 36 |
| 7 | 32 |

TABLE 4

SRS bandwidth when $80 < N_{RB}^{UL} \leq 110$

| SRS bandwidth configuration | SRS bandwidth b = 0 $m_{SRS,b}$ |
|---|---|
| 0 | 96 |
| 1 | 96 |
| 2 | 80 |
| 3 | 72 |
| 4 | 64 |
| 5 | 60 |
| 6 | 48 |
| 7 | 48 | wherein $N_{RB}^{UL}$ is a overall uplink bandwidth represented by Resource Block, b=0 represents the largest bandwidth level, mSRS,b represents the bandwidth with which the SRS is transmitted, and the SRS bandwidth configuration comprises cell-level SRS bandwidth configuration, thereby permitting the UE to detect channel information more accurately by maintaining a signal-to-noise (SNR) ratio in the SRS bandwidth, wherein the largest bandwidth level includes an indication of the largest SRS bandwidth level received from a network side before transmitting the SRS with the uplink pilot time slot each time, or a stored indication of the largest bandwidth level indicating the largest SRS bandwidth level received from the network side.

12. The device according to claim 11, further comprising:
an indication receiving unit configured to receive the transmitted signaling indication, wherein the received signaling indication is the signaling indication transmitted from the base station in the case that the UE including the device is detected not to reach the power limit;

an indication determining unit configured to determine the SRS bandwidth corresponding to the signaling indication transmitted from the indication receiving unit.

13. The device according to claim 12, wherein the device is located in the UE.

14. A device for a determining the transmission bandwidth of an uplink sounding reference signal, comprising:

a detecting unit configured to detect whether a user equipment (UE) reaches a power limit when the UE is informed to transmit the sounding reference signal (SRS) with the largest bandwidth level;

an informing unit configured to inform the UE to transmit the SRS with a non-extensive SRS bandwidth when the detecting unit detects the UE reaches the power limit, the SRS bandwidth including cell-level SRS bandwidth configurations obtained by the UE from preliminary broadcast notification of the cells, wherein the non-extensive SRS bandwidth is determined by any one of tables, Table 1 to Table 4 comprising:

TABLE 1

SRS bandwidth when $6 \leq N_{RB}^{UL} \leq 40$

| SRS bandwidth configuration | SRS bandwidth b = 0 $m_{SRS,b}$ |
|---|---|
| 0 | 36 |
| 1 | 32 |
| 2 | 24 |
| 3 | 20 |
| 4 | 16 |
| 5 | 12 |
| 6 | 8 |
| 7 | 4 |

TABLE 2

SRS bandwidth when $40 < N_{RB}^{UL} \leq 60$

| SRS bandwidth configuration | SRS bandwidth b = 0 $m_{SRS,b}$ |
|---|---|
| 0 | 48 |
| 1 | 48 |
| 2 | 40 |
| 3 | 36 |
| 4 | 32 |
| 5 | 24 |
| 6 | 20 |
| 7 | 16 |

TABLE 3

SRS bandwidth when $60 < N_{RB}^{UL} \leq 80$

| SRS bandwidth configuration | SRS bandwidth b = 0 $m_{SRS,b}$ |
|---|---|
| 0 | 72 |
| 1 | 64 |
| 2 | 60 |
| 3 | 48 |
| 4 | 48 |
| 5 | 40 |
| 6 | 36 |
| 7 | 32 |

TABLE 4

| SRS bandwidth when $80 < N_{RB}^{UL} \leq 110$ | |
|---|---|
| SRS bandwidth configuration | SRS bandwidth b = 0 $m_{SRS, b}$ |
| 0 | 96 |
| 1 | 96 |
| 2 | 80 |
| 3 | 72 |
| 4 | 64 |
| 5 | 60 |
| 6 | 48 |
| 7 | 48 | wherein $N_{RB}^{UL}$ is a overall uplink bandwidth represented by Resource Block, b=0 represents the largest bandwidth level, mSRS,b represents the bandwidth with which the SRS is transmitted, and the SRS bandwidth configuration comprises cell-level SRS bandwidth configuration,
wherein the largest bandwidth level includes an indication of the largest SRS bandwidth level received from a network side before transmitting the SRS with the uplink pilot time slot each time or a stored indication of the largest bandwidth level indicating the largest SRS bandwidth level received from the network side, thereby permitting the UE to detect channel information more accurately by maintaining a signal-to-noise (SNR) ratio in the SRS bandwidth.

15. The device according to claim 14, wherein the informing unit informs the UE to transmit the SRS with the non-extensive SRS bandwidth by a signaling indication.

16. The device according to claim 14, wherein, when the detecting unit detects the UE does not reach the power limit, the device further comprises:

an indicating unit configured to indicate that the UE transmits the SRS in the uplink pilot time slot with corresponding bandwidth according to a preset signaling indication.

17. The device according to claim 14, wherein the device is located in the base station.

* * * * *

UNITED STATES PATENT AND TRADEMARK OFFICE
CERTIFICATE OF CORRECTION

| | | |
|---|---|---|
| PATENT NO. | : 9,125,205 B2 | Page 1 of 1 |
| APPLICATION NO. | : 13/056911 | |
| DATED | : September 1, 2015 | |
| INVENTOR(S) | : Pan et al. | |

It is certified that error appears in the above-identified patent and that said Letters Patent is hereby corrected as shown below:

IN THE SPECIFICATION:

Column 2, line 33:

Now reads: "as follow:"

Should read: -- as follows: --

Column 3, line 17-18:

Now reads: "detects the UE reaches"

Should read: -- detects the UE and reaches --

Signed and Sealed this
Twenty-second Day of March, 2016

Michelle K. Lee
*Director of the United States Patent and Trademark Office*